(12) United States Patent
Liu et al.

(10) Patent No.: US 11,391,447 B2
(45) Date of Patent: Jul. 19, 2022

(54) BACKLIGHT MODULE, DISPLAY DEVICE AND BACKLIGHT MODULE MANUFACTURING METHOD

(71) Applicant: WUHAN CHINA STAR OPTOELECTRONICS TECHNOLOGY CO., LTD., Hubei (CN)

(72) Inventors: Fancheng Liu, Hubei (CN); Guowei Zha, Hubei (CN); Chunhung Huang, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 197 days.

(21) Appl. No.: 16/632,441

(22) PCT Filed: Nov. 8, 2019

(86) PCT No.: PCT/CN2019/116443
§ 371 (c)(1),
(2) Date: Jan. 20, 2020

(87) PCT Pub. No.: WO2021/031379
PCT Pub. Date: Feb. 25, 2021

(65) Prior Publication Data
US 2022/0003388 A1    Jan. 6, 2022

(30) Foreign Application Priority Data

Aug. 22, 2019    (CN) .......................... 201910778619.8

(51) Int. Cl.
*F21V 19/00*    (2006.01)
*F21V 9/30*     (2018.01)
(Continued)

(52) U.S. Cl.
CPC .............. *F21V 19/005* (2013.01); *F21V 9/30* (2018.02); *F21Y 2105/16* (2016.08); *F21Y 2115/10* (2016.08)

(58) Field of Classification Search
CPC ................................. F21V 19/005; F21V 9/30
See application file for complete search history.

(56) References Cited

U.S. PATENT DOCUMENTS

| 9,086,515 B2 * | 7/2015 | Zhao .................... G02B 6/0055 |
| 2009/0141512 A1 * | 6/2009 | Eberwein ............. G02B 6/0086 362/497 |

(Continued)

FOREIGN PATENT DOCUMENTS

CN    208606014 U    *  3/2019

OTHER PUBLICATIONS

English translation of CN208606014 Lai, Mar. 15, 2019 (Year: 2019).*

*Primary Examiner* — Evan P Dzierzynski (57) ABSTRACT

The present invention provides a backlight module, a display device, and a backlight module manufacturing method. The backlight module includes a reinforcing plate, a back adhesive, a plurality of light boards spliced with one another, and a fluorescent film. Back adhesive splicing gaps in the back adhesive are staggered with light board splicing gaps. The backlight module manufacturing method includes steps as follows: providing a reinforcing plate; manufacturing a back adhesive on the reinforcing plate; splicing a plurality of light boards on the back adhesive; and manufacturing a fluorescent film on the light boards.

10 Claims, 5 Drawing Sheets

(51) Int. Cl.
  *F21Y 105/16*  (2016.01)
  *F21Y 115/10*  (2016.01)

(56) References Cited

U.S. PATENT DOCUMENTS

2012/0182716 A1* 7/2012 Zhang ............... G02F 1/133604
                                                          362/92
2016/0320552 A1* 11/2016 Zhou .................... G02B 6/0091
2018/0149808 A1* 5/2018 Yang .................... G02B 6/0065
2020/0012040 A1* 1/2020 Yuan .................... G02B 6/0091
2020/0341333 A1* 10/2020 Qiu ....................... F21V 31/005

* cited by examiner

BACKLIGHT MODULE, DISPLAY DEVICE AND BACKLIGHT MODULE MANUFACTURING METHOD

FIELD OF INVENTION

The present invention relates to a field of displays, especially to a backlight module, a display device, and a backlight module manufacturing method.

BACKGROUND OF INVENTION

Mini-light emitting diodes (Mini-LED) backlight module has advantages of high brightness, super narrow bezel, special shapes, and capability of achieving partial-area light control, and are therefore acquire lots of attention.

A backlight module of a small dimensional display device such as a mobile phone can be formed and manufactured at one time. due to limitation of dimensions to devices, a mini-light emitting diode backlight module with a large dimension can only be manufactured by splicing pieces.

Multiple medium large mini-light emitting diode backlight modules are spliced to achieve a module with a greater dimension. At present, issue exist in the industries as follows: bending a non-flatness in spliced boundaries; dark lines occur due to broken parts in the spliced boundaries, light cut-off and trimmed dark edges in the spliced boundaries. Such issues can usually be concealed by a large light mixing space. However, as a thickness of the backlight module becomes thinner, a preserved light mixing space thereof becomes more limited, which such that dark lines appears due to uneven light mixture in spliced boundaries among the mini-light emitting diode backlight module.

Therefore, a new backlight module, a new display device, and a new backlight module manufacturing method are required for solving the above issue.

SUMMARY OF INVENTION

Technical Issue

An objective of the present invention is to provide a backlight module, a display device, and a backlight module manufacturing method that solve the issue of dark lines caused by uneven light mixture in spliced boundaries in a large dimensional mini-light emitting diodes backlight module.

Technical Solution

To achieve to above objective, the present invention provides a backlight module, comprising: a reinforcing plate; a back adhesive disposed on the reinforcing plate; a plurality of light boards spliced with one another and disposed on the back adhesive; and a fluorescent film disposed on the light boards; wherein back adhesive splicing gaps defined in the back adhesive are staggered with light board splicing gaps defined among the light boards.

Furthermore, the backlight module further comprises a transparent film, and the transparent film is disposed on the fluorescent film.

Furthermore, a transparent adhesive is filled in each of the light board splicing gaps among the light boards, a refractive index of the transparent adhesive is similar to a refractive index of the light boards.

Furthermore, each of the light boards comprises a substrate and a plurality of light emitting diodes disposed on the substrate and arranged in an array.

Furthermore, the backlight module further comprises an optical film set, and the optical film set is disposed on the fluorescent film.

The present invention also provides a backlight module manufacturing method, comprising steps as follows:

providing a reinforcing plate;

manufacturing a back adhesive on the reinforcing plate;

splicing a plurality of light boards on the back adhesive, wherein back adhesive splicing gaps defined in the back adhesive are staggered with light board splicing gaps defined among the light boards; and manufacturing a fluorescent film on the light boards.

Furthermore, after the step of manufacturing the fluorescent film, the manufacturing method further comprises: manufacturing a transparent film on the fluorescent film.

Furthermore, after the step of splicing a plurality of light boards and before the step of manufacturing the fluorescent film, the manufacturing method further comprises: a transparent adhesive filling step, filling a transparent adhesive in each of the light board splicing gaps among the light boards, wherein a refractive index of the transparent adhesive is similar to a refractive index of the light boards.

Furthermore, after the step of manufacturing the fluorescent film, the manufacturing method further comprises: manufacturing an optical film set on the fluorescent film.

The present invention also provides a display device, comprising the backlight module and a display panel disposed on the backlight module.

Advantages

Advantages of the present invention are that the provided backlight module, display device, and backlight module manufacturing method coat the fluorescent film and the transparent film integrally on the spliced light boards to guarantee continuous light transmission to further solve the issue of the dark lines in the light board splicing gaps. The transparent adhesive filled in each of the splicing gaps among the light boards with a refractive index thereof similar to that of the light boards solves the issue of dark lines caused by uneven light mixture in spliced boundaries in a large dimensional mini-light emitting diodes backlight module. The reinforcing plate can be a bottom backplate essential for structures of the backlight module, or individually employs an aluminum backplate with a thickness of 0.1 um-0.3 um, or can be a hard backplate made of other material, which drastically decreases a thickness of the backlight module and facilitates thinness and lightness more. The back adhesive splicing gaps of the back adhesive are staggered with the light board splicing gaps of the light boards to facilitate fixability of connection such that light is reflected by the back adhesive in the light board splicing gaps to enhance brightness in the spliced boundaries of the light boards and prevent dark shadow in the spliced boundaries to achieve even brightness of the backlight module.

Reference numerals are as follows:

1, reinforcing plate; 2, back adhesive; 3, light boards; 4, fluorescent film; 5, transparent film, 6, optical film set; 10, backlight module; 11, light board splicing gaps;

12, back adhesive splicing gaps; 20, display panel; 30, transparent adhesive, 31, substrate; 32, light emitting diodes; 61, diffuser plate; 62, lower brightness enhancement plate, 63, upper brightness enhancement plate; 100, display device.

DETAILED DESCRIPTION OF PREFERRED EMBODIMENTS

Each of the following embodiments is described with appending figures to illustrate specific embodiments of the present invention that are applicable. The terminologies of direction mentioned in the present invention, such as "upper", "lower", "front", "rear", "left", "right", "inner", "outer", "side surface", etc., only refer to the directions of the appended figures. Therefore, the terminologies of direction are used for explanation and comprehension of the present invention, instead of limiting the present invention. In the figures, units with similar structures are marked with the same reference characters.

In the drawings, for clarity, thicknesses of layers and regions are exaggerated. For example, for convenience of description, thicknesses and dimensions of elements in the drawings are illustrated arbitrarily. Therefore, the described technical scope is not limited by the drawings.

Furthermore, it should be explained that in addition, the term "comprise" and any variant thereof is intended to cover non-exclusive inclusion such that a process, an article, or an apparatus including a series of elements not only includes those elements but also includes other elements that are not explicitly listed out, or still includes inherent elements essential for the process, method, product, or apparatus.

First Embodiment

Figure 1:
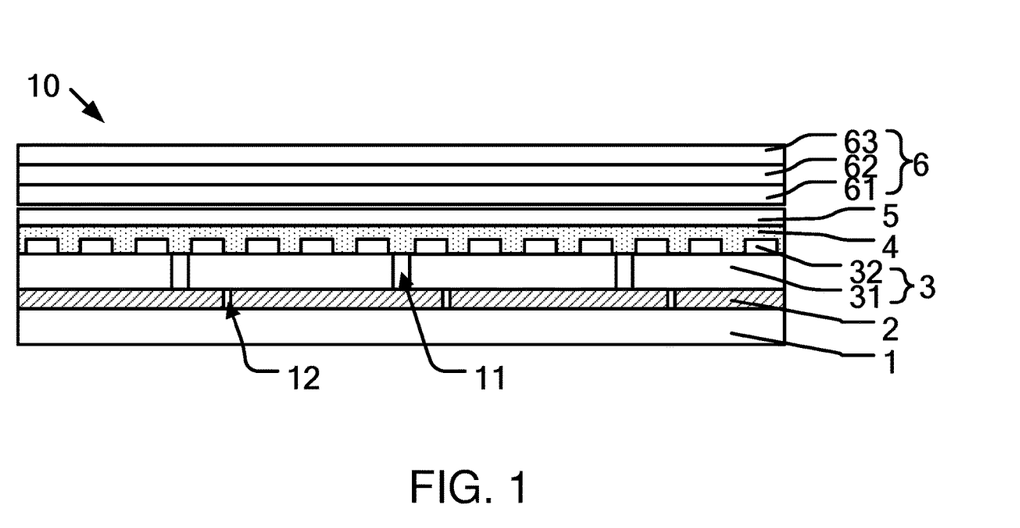
FIG. 1 is a schematic structural view of a backlight module of a first embodiment of the present invention.

With reference to FIG. 1, a first embodiment of the present invention provides a backlight module 10, comprising a reinforcing plate 1, a back adhesive 2, a plurality of light boards 3 spliced with one another, and a fluorescent film 4. Specifically, the back adhesive 2 is disposed on the reinforcing plate 1. The spliced light boards 3 are disposed on the back adhesive 2. The fluorescent film 4 is disposed on the light boards 3. The fluorescent film 4 covers the light boards 3 in an integral form to prevent the fluorescent film 4 from being broken in light board splicing gaps 11 defined among the light boards 3 and resulting in damages of continuity of light transmission. The fluorescent film 4 guarantees continuity of light transmission to solve the issue of dark lines in the light board splicing gaps 11.

In the present invention, the back adhesive 2 is in an integral form or a spliced form. With reference to FIG. 1, when the back adhesive 2 are in the spliced form, back adhesive splicing gaps 12 defined in the back adhesive 2 are staggered with the light board splicing gaps 11 of the light boards 3, which facilitates fixability of connection such that light is reflected by the back adhesive 2 in the light board splicing gaps 11 to enhance brightness in the spliced boundaries of the light boards 3 and prevent dark shadow in the spliced boundaries to achieve even brightness of the backlight module.

In other embodiment, the back adhesive 2 can be vertically staggered with the light boards 3 to be engaged with one another to enhance brightness in the spliced boundaries of the light boards 3 and prevent dark shadow in the spliced boundaries.

In the present invention, the reinforcing plate 1 can be a bottom backplate essential for structures of the backlight module 10, or individually employs an aluminum backplate with a thickness of 0.1 um-0.3 um, or can be a hard backplate made of other material. Thus, compared to the way of increasing a light mixing distance of light emitting diodes (LEDs) or the way of increasing a thickness or layers of a diffuser plate, the present invention drastically decreases a thickness of the backlight module 10 and facilitates thinness and lightness more.

The back adhesive 2 can employ an adhesive material with high reflective index and low shrinkage such that light is reflected in the light board splicing gaps 11 to enhance brightness in the spliced boundaries of the light boards 3 and prevent dark shadow in the spliced boundaries to achieve even brightness of the backlight module 10.

With reference to FIG. 1, the backlight module 10 further comprises a transparent film 5. The transparent film 5 is disposed on the fluorescent film 4. The transparent film 5 guarantees continuity of light transmission in the light board splicing gaps 11 and protects integrity of the fluorescent film 4 to further solve the issue of dark lines in the light board splicing gaps 11.

With reference to FIG. 1, the light boards 3 comprises a substrate 31, and a light emitting diodes 32, the light emitting diodes 32 are disposed on the substrate 31 and are arranged in an array. A refractive index of the substrate 31 is similar to a refractive index of the transparent adhesive 30 to guarantee continuity of light transmission in the light board splicing gaps 11 as possible.

The backlight module 10 comprises an optical film set 6, and the optical film set 6 is disposed on the fluorescent film 4.

The optical film set 6 comprises a diffuser plate 61, a lower brightness enhancement plate 62, and an upper brightness enhancement plate 63. Specifically, the diffuser plate 61 is disposed on the light boards 3. The lower brightness enhancement plate 62 is disposed on the diffuser plate 61. The upper brightness enhancement plate 63 is disposed on the lower brightness enhancement plate 62. The optical film set 6 is configured to improve brightness and uniformity of a light source. The diffuser plate 61 can enhance brightness of the light source. The lower brightness enhancement plate 62 provides an area light source for light diffusion. The upper brightness enhancement plate 63 can enhance brightness of the light source. A light emitting effect of the backlight module 10 directly affects a visual effect thereof.

Figure 2:
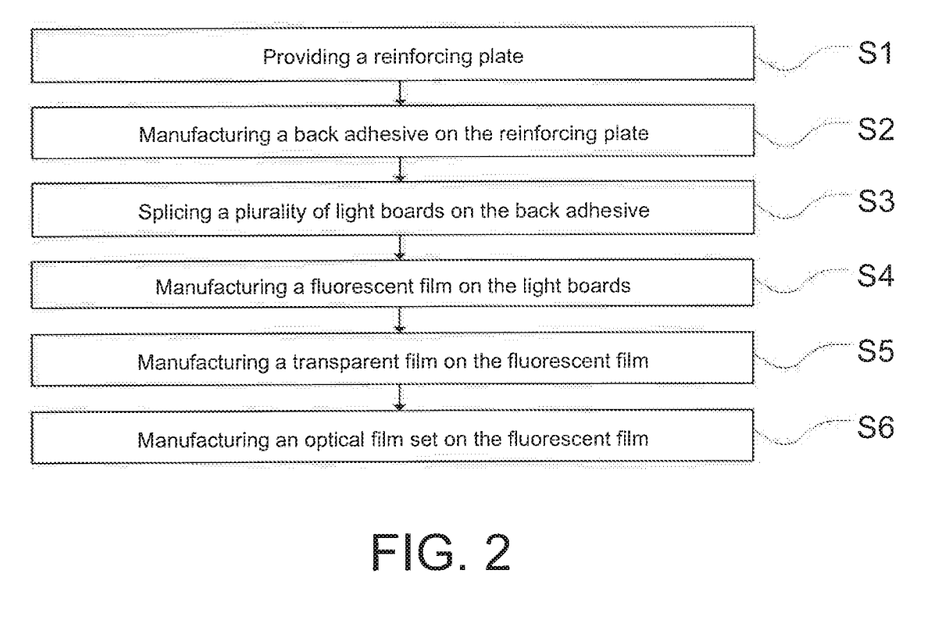
FIG. 2 is a flowchart of a backlight module manufacturing method of the first embodiment of the present invention.

With reference to FIG. 2, the present invention also provides a manufacturing method for the backlight module 10 comprising steps S1-S5 as follows.

The step S1 comprises providing a reinforcing plate 1. The reinforcing plate 1 can be a bottom backplate essential for structures of the backlight module 10, or individually employs an aluminum backplate with a thickness of 0.1 um-0.3 um, or can be a hard backplate made of other material. Thus, compared to the way of increasing a light mixing distance of light emitting diodes (LEDs) or the way of increasing a thickness or layers of a diffuser plate, the present invention drastically decreases a thickness of the backlight module 10 and facilitates thinness and lightness more.

The step S2 comprises manufacturing a back adhesive 2 on the reinforcing plate 1. The back adhesive 2 can employ an adhesive material with high reflective index and low shrinkage such that light is reflected in the light board splicing gaps 11 to enhance brightness in the spliced boundaries of the light boards 3 and prevent dark shadow in the spliced boundaries to achieve even brightness of the backlight module 10.

The step S3 comprises splicing a plurality of light boards 3 on the back adhesive 2. The back adhesive 2 is in an integral form or a spliced form. When the back adhesive 2 is in the spliced form, back adhesive splicing gaps 12 defined in the back adhesive 2 are staggered with the light board splicing gaps 11 of the light boards 3 to facilitate fixability of connection. The back adhesive 2 can employ an adhesive material with high reflective index and low shrinkage. Two kinds of the splicing gaps are staggered such that light is reflected in the light board splicing gaps 11 to enhance brightness in the spliced boundaries of the light boards 3 and prevent dark shadow in the spliced boundaries to achieve even brightness of the backlight module 10.

The step S4 comprises manufacturing a fluorescent film 4 on the light boards 3. Specifically, the fluorescent film 4 are coated integrally on the spliced light boards 3 to prevent damage of continuity of light transmission, resulting from the fluorescent film 4 broken in the light board splicing gaps 11. The fluorescent film 4 guarantees continuity of light transmission in the pressed films and further solve the issue of the dark lines in the light board splicing gaps 11.

In the present invention, after the step S4 of manufacturing the fluorescent film 4, further comprises the step S5.

The step S5 comprises manufacturing a transparent film 5 on the fluorescent film 4. The transparent film 5 guarantees continuity of light transmission in the light board splicing gaps 11 and protects integrity of the fluorescent film 4 to further solve the issue of dark lines in the light board splicing gaps the light board splicing gaps 11.

In the present invention, after the step S4 of manufacturing the fluorescent film 4, further comprises the step S6.

The step S6 comprises manufacturing an optical film set 6 on the fluorescent film 4.

The optical film set 6 comprises a diffuser plate 61, a lower brightness enhancement plate 62, and an upper brightness enhancement plate 63. Specifically, the diffuser plate 61 is disposed on the light boards 3. The lower brightness enhancement plate 62 is disposed on the diffuser plate 61. The upper brightness enhancement plate 63 is disposed on the lower brightness enhancement plate 62. The optical film set 6 is configured to improve brightness and uniformity of a light source. the diffuser plate 61 can enhance brightness of the light source. The lower brightness enhancement plate 62 provides an area light source for light diffusion. The upper brightness enhancement plate 63 can enhance brightness of the light source. A light emitting effect of the backlight module 10 directly affects a visual effect thereof.

It should be explained that the step S5 can be omitted. If the step S5 exists, the step S6 is after the step S5.

Second Embodiment

Figure 3:
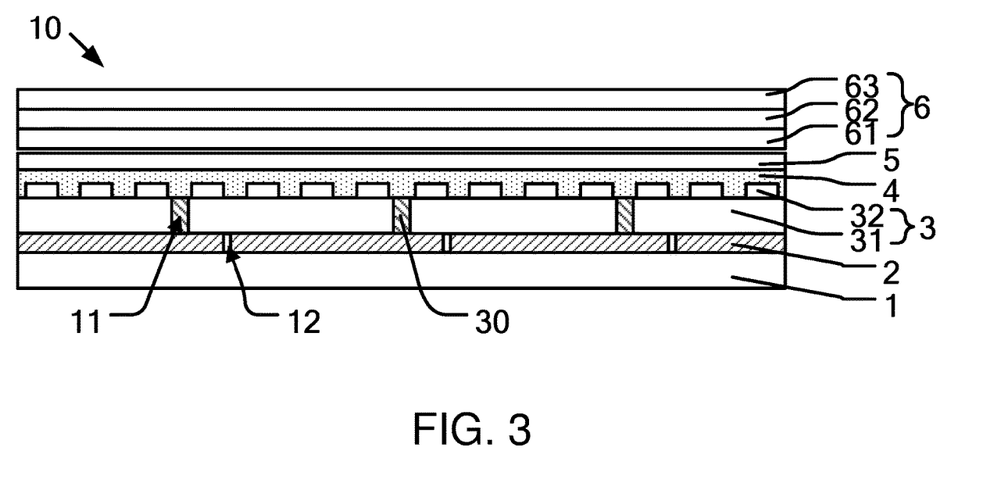
FIG. 3 is a schematic structural view of a backlight module of a second embodiment of the present invention.

With reference to FIG. 3, the second embodiment includes all features as included in the first embodiment, and a difference of the second embodiment from the first embodiment is that a transparent adhesive 30 is filled in each of the light board splicing gaps 11 among the light boards 3.

The transparent adhesive 30 includes a hot melting adhesive, an ultra violet (UV) adhesive, etc. A refractive index of the transparent adhesive 30 is similar to a refractive index of the light boards 3 to guarantee continuity of light transmission in the light board splicing gaps 11 as possible such that the issue of dark lines in the light board splicing gaps 11 is solved.

Figure 4:
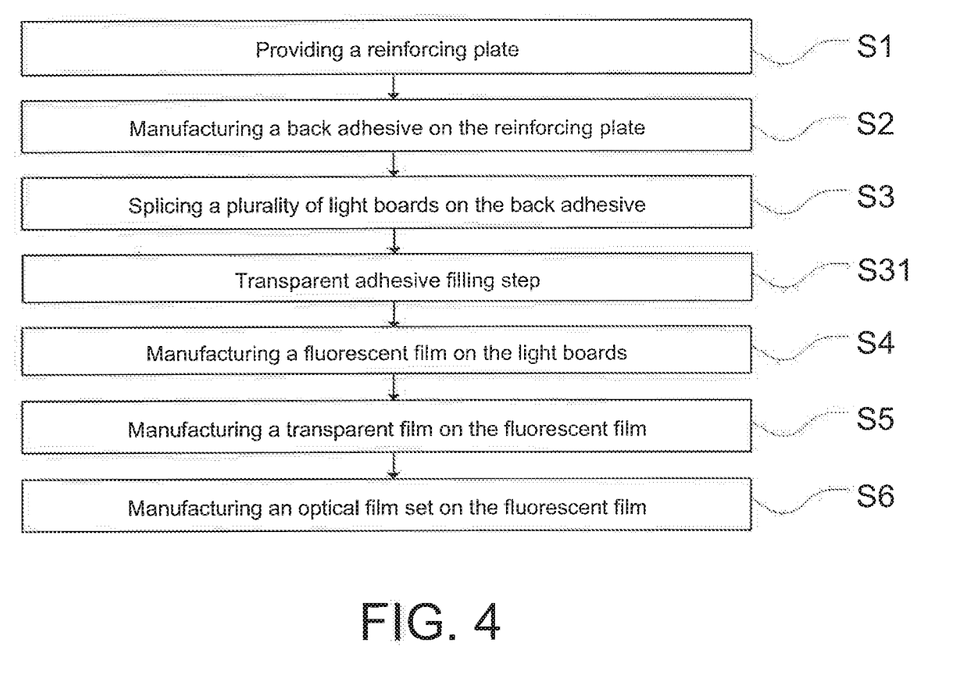
FIG. 4 is a flowchart of a backlight module manufacturing method of the second embodiment of the present invention.

With reference to FIG. 4, the second embodiment also provides a manufacturing method for the backlight module 10 with all the features in the first embodiment. A difference of the second embodiment from the first embodiment is that after the step S3 of splicing the light boards and before the step S4 of manufacturing the fluorescent film, the manufacturing method further comprises a step S31.

The step S31, which is a transparent adhesive filling step, comprises filling a transparent adhesive 30 in each of the light board splicing gaps 11 among the light boards 3. A refractive index of the transparent adhesive 30 is similar to a refractive index of the light boards 3.

The transparent adhesive 30 includes a hot melting adhesive, an ultra violet (UV) adhesive, etc. A refractive index of the transparent adhesive 30 is similar to a refractive index of the light boards 3 to guarantee continuity of light transmission in the light board splicing gaps 11 as possible such that the issue of dark lines in the light board splicing gaps 11 is solved.

Figure 5:
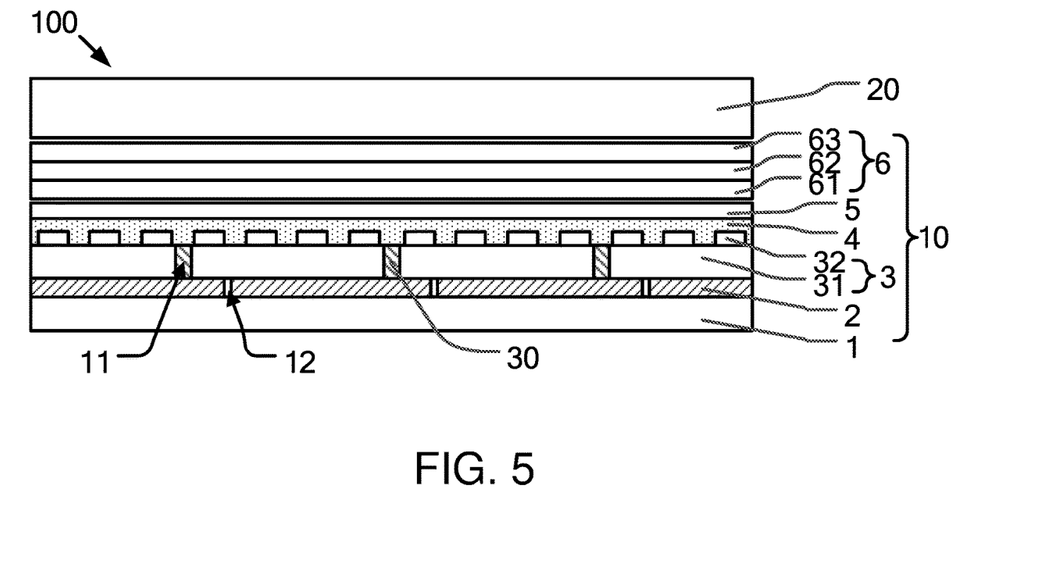
FIG. 5 is a schematic structural view of a display device of an embodiment of the present invention.

With reference to FIG. 5, the present invention also provides a display device 100 comprising the backlight module 10 of the first or second embodiment and the display panel 20 disposed on the backlight module 10.

The display device 100 in the present embodiment can be a product or component with display functions such as a mobile phone, a tablet, a television, a display, a laptop, a digital photo frame, or a navigator.

Working principles of the display device 100 provided by the present embodiment are the same as those of the backlight module 10 of the first and second embodiments, and specific structure relations refer to the backlight module 10 of the embodiments and will not be repeatedly described herein.

Advantages of the present invention are that the provided backlight module 10, display device 100, and manufacturing method for the backlight module 10 coat the fluorescent film and the transparent film integrally on the spliced light boards to guarantee continuous light transmission to further solve the issue of the dark lines in the light board splicing gaps 11. The transparent adhesive 30 filled in each of the splicing gaps among the light boards 3 with a refractive index thereof similar to that of the light boards 3 solves the issue of dark lines caused by uneven light mixture in spliced boundaries in a large dimensional mini-light emitting diodes backlight module 10. The reinforcing plate 1 can be a bottom backplate essential for structures of the backlight module 10, or individually employs an aluminum backplate with a thickness of 0.1 um-0.3 um, or can be a hard backplate made of other material, which drastically decreases a thickness of the backlight module 10 and facilitates thinness and lightness more. The back adhesive splicing gaps 12 of the back adhesive 2 are staggered with the light board splicing gaps 11 of the light boards 3 to facilitate fixability of connection such that light is reflected by the back adhesive 2 in the light board splicing gaps 11 to enhance brightness in the spliced boundaries of the light boards 3 and prevent dark shadow in the spliced boundaries to achieve even brightness of the backlight module 10.

The above is only preferred embodiments of the present invention. It should be noted that a person of ordinary skill in the art can make several improvements and modifications without departing from the principle of the present invention. These improvements and modifications should also be considered to be within the scope of protection of the present invention.

What is claimed is:

1. A backlight module, comprising:
    a reinforcing plate;
    a back adhesive disposed on the reinforcing plate;
    a plurality of light boards spliced with one another and disposed on the back adhesive; and
    a fluorescent film disposed on the light boards;
    wherein back adhesive splicing gaps defined in the back adhesive are staggered with light board splicing gaps defined among the light boards;
    wherein the back adhesive is divided by the back adhesive splicing gaps into segmental regions, each segmental region is adhered to at least two of the light boards, and an area of the segment region of the back adhesive is greater than an area of the back adhesive splicing gap.

2. The backlight module as claimed in claim 1 further comprising a transparent film, wherein the transparent film is disposed on the fluorescent film.

3. The backlight module as claimed in claim 1, wherein a transparent adhesive is filled in each of the light board splicing gaps among the light boards, a refractive index of the transparent adhesive is similar to a refractive index of the light boards.

4. The backlight module as claimed in claim 1, wherein each of the light boards comprises:
    a substrate; and
    a plurality of light emitting diodes disposed on the substrate and arranged in an array.

5. The backlight module as claimed in claim 1, wherein the backlight module further comprises an optical film set, and the optical film set is disposed on the fluorescent film.

6. A display device, comprising the backlight module as claimed in claim 1 and a display panel disposed on the backlight module.

7. A backlight module manufacturing method, comprising steps as follows:
    providing a reinforcing plate;
    manufacturing a back adhesive on the reinforcing plate;
    splicing a plurality of light boards on the back adhesive, wherein back adhesive splicing gaps defined in the back adhesive are staggered with light board splicing gaps defined among the light boards; and
    manufacturing a fluorescent film on the light boards;
    wherein the back adhesive is divided by the back adhesive splicing gaps into segmental regions, each segmental region is adhered to at least two of the light boards, and an area of the segment region of the back adhesive is greater than an area of the back adhesive splicing gap.

8. The backlight module manufacturing method as claimed in claim 7, wherein after the step of manufacturing the fluorescent film, the manufacturing method further comprises:
    manufacturing a transparent film on the fluorescent film.

9. The backlight module manufacturing method as claimed in claim 7, wherein after the step of splicing a plurality of light boards and before the step of manufacturing the fluorescent film, the manufacturing method further comprises:
    a transparent adhesive filling step, filling a transparent adhesive in each of the light board splicing gaps among the light boards, wherein a refractive index of the transparent adhesive is similar to a refractive index of the light boards.

10. The backlight module manufacturing method as claimed in claim 7, wherein after the step of manufacturing the fluorescent film, the manufacturing method further comprises:
    manufacturing an optical film set on the fluorescent film.

* * * * *